Dec. 7, 1965  M. J. H. STAAR  3,221,585
TAPE SEVERING MEANS FOR DICTATING MACHINES
Filed March 22, 1962  9 Sheets-Sheet 1

INVENTOR.
MARCEL JULES HELENE STAAR
BY
ATTYS.

FIG. 4

INVENTOR.
MARCEL JULES HELENE STAAR

Dec. 7, 1965  M. J. H. STAAR  3,221,585
TAPE SEVERING MEANS FOR DICTATING MACHINES
Filed March 22, 1962  9 Sheets-Sheet 8

INVENTOR.
MARCEL JULES HELENE STAAR
BY
Wolfe, Hubbard, Voit & Osann.
ATTYS.

United States Patent Office 3,221,585
Patented Dec. 7, 1965

3,221,585
TAPE SEVERING MEANS FOR
DICTATING MACHINES
Marcel Jules Helene Staar, Brussels, Belgium, assignor to
Usines Gustave Staar, S.A., Brussels, Belgium, a corporation of Belgium
Filed Mar. 22, 1962, Ser. No. 181,545
Claims priority, application Belgium, Sept. 6, 1961,
607,910
7 Claims. (Cl. 83—221)

This invention relates to apparatus for sound recording and playback, and more particularly to dictating machines using a relatively wide band of tape stored in the machine in the form of a roll, wherein the recording is in the form of longitudinally spaced transverse traces across the tape.

The main object of the present invention is to provide a dictating machine in which the tape is stored in the machine in the form of a roll, is unwound from the roll and fed through the machine as an incident to the recording process, and is severed into short recording bearing lengths for convenience in transcription and handling.

A more specific object of the invention is to provide in apparatus of this type for manually cutting the tape transversely into sections of any desired length. Another object is to provide for cutting the tape transversely immediately upstream of a final recording trace, and for automatically providing a margin between the final trace and the newly formed end of the tape.

A further object is to provide for making a clean straight cut across the tape by a simple manipulation of a cutting mechanism.

Other objects and advantages will become apparent as the following description proceeds, taken in connection with the accompanying drawings, wherein:

FIG. 11 is a plan view looking at the underside of the knife bar slidably carrying the knife carriage;

While the invention is susceptible of various modifications and alternative constructions, illustrative embodiments have been shown in the drawings and will be described below in considerable detail. It should be understood, however, that there is no intention to limit the invention to the specific forms disclosed, but on the contrary, the intention is to cover all modifications, alternative constructions and equivalents falling within the spirit and scope of the invention as expressed in the appended claims.

GENERAL MACHINE ORGANIZATION

Figure 1:
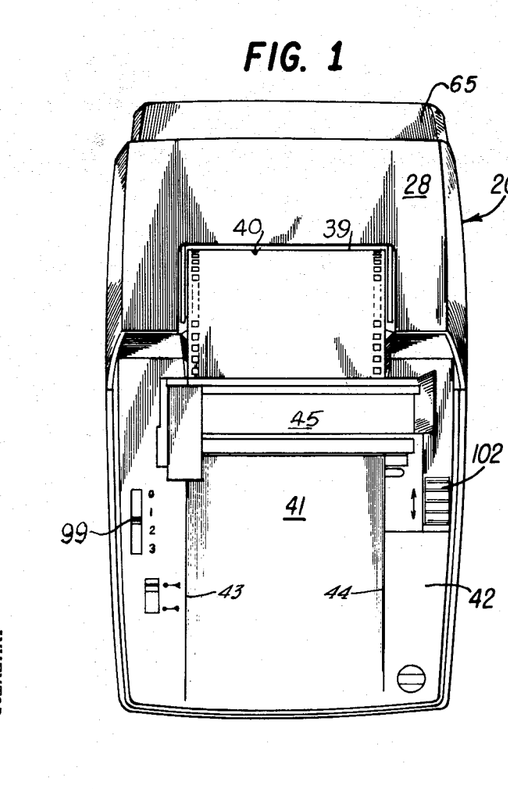
FIGURE 1 is a plan view of a dictating machine embodying the present invention, with a roll of tape in the machine having the end of the tape inserted for recording.
Figure 2:
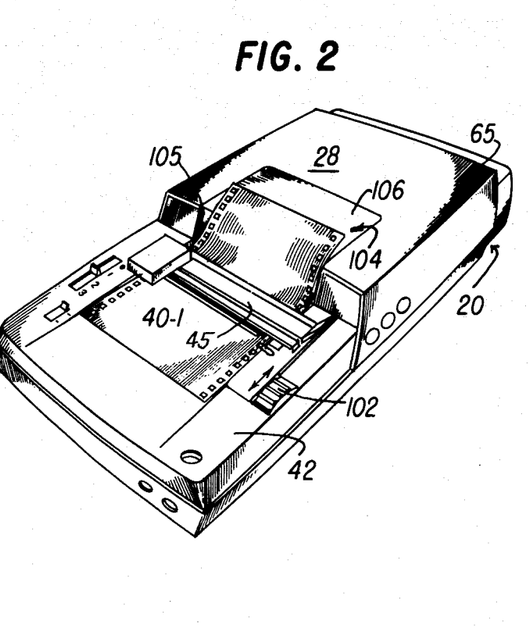
FIG. 2 is a perspective view of the dictating machine shown in FIGURE 1 with a separate length of tape inserted in the machine for transcription.
Figure 2:
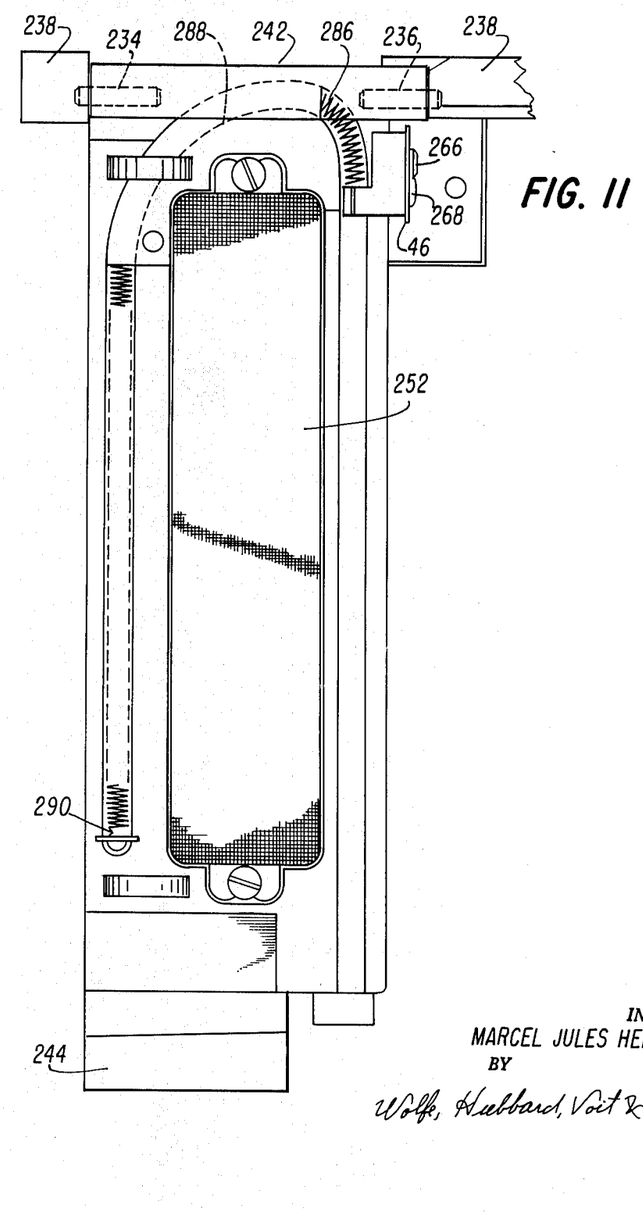
Figures 5, 5A:
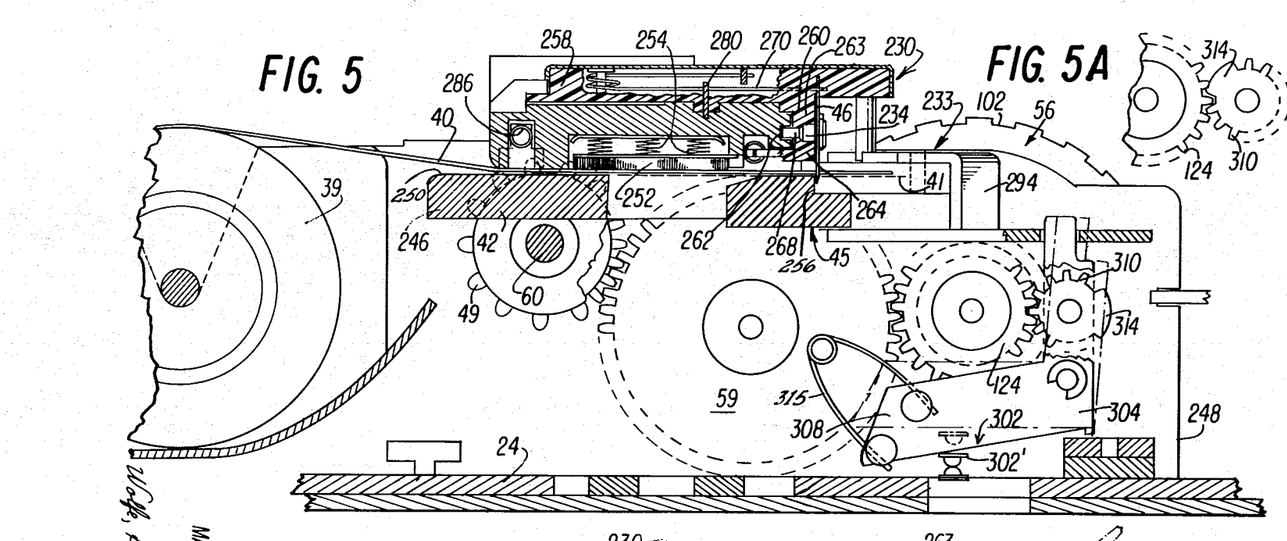
FIG. 5 is a fragmentary longitudinal sectional view taken in the plane of lines 5—5 in FIG. 4.
FIG. 5A is a detail diagrammatic view illustrating the operation of the knife switch release gear.

Upon more specific reference to the drawings, it will be perceived that the invention is there exemplified in an illustrative dictating machine 20 built in the form of a compact, lightweight unit adapted for recording (FIG. 1) or for transcription (FIG. 2). In general, such machine comprises a housing having a flat base 24 (FIG. 3) bounded by half side walls 26 within which the components of the machine are mounted. A cover carried by the side walls 26 conceals and protects the components. The housing has a raised forward portion 28 in which a recess is provided for receiving a roll 39 of relatively wide tape 40, such tape being led from the roll as shown in FIGURES 1 and 5, for example, onto a flat surface 41 on a portion of the housing 42 over which the tape is guided between lateral abutments 43, 44 (FIG. 1) while being intermittently advanced during the recording or transcription process.

According to one of the features of the present invention, to be described more fully below, pivotally mounted knife bar 45 extends transversely across the machine above the tape 40 and provides support for a transversely movable knife 46 (shown in lowered position in FIG. 5) which is manually operable to sever dictation bearing lengths of tape from the roll 39. To facilitate positioning the end of the tape under the bar 45, the latter is pivotally mounted so that it may be raised to an upward position as shown in phantom in FIG. 3. The tape is advanced under the bar 45 and along the surface 41 past a transversely reciprocated recording head 47 which is located substantially in the plane of the surface 41 over which the tape is fed and is directly in contact with the underside of the tape for recording purposes. As herein shown, the tape 40 is in the form of a magnetizable layer on a backing or support of plastic film or like material, having evenly spaced perforations 48 in the margins of the tape. The tape is fed by means of a drive mechanism therefor; herein shown as including a pair of sprockets 49 mounted under the margins of the tape and such sprockets project slightly above the supporting surface 41 for the tape to engage in the perforations 48 in the tape.

Figure 4:
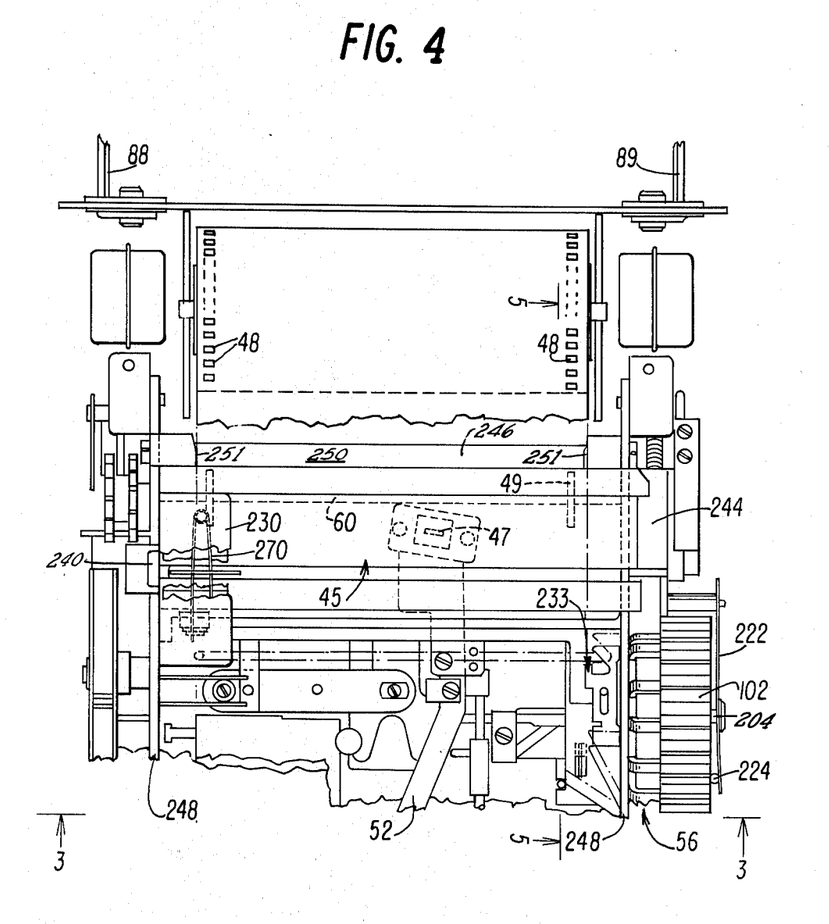
FIG. 4 is a fragmentary plan view of the machine with the cover removed.

As illustrated generally in FIG. 4, the recording and playback head 47 is supported on a pivotally mounted arm 52 which is reciprocated transversely by a drive mechanism powered by a motor (not shown) carried by the arm. For a detailed description of the means for support and drive of the recording and playback head 47, reference may be made to the United States Patent No. 3,124,360, issued March 10, 1964, of Marcel Jules Helene Staar, entitled, Dictating Machine Drive Mechanism. As illustrated generally in FIG. 5, the drive for the tape comprises a stepping motor 56 adapted to advance the tape in even increments of movement connected through suitable gearing 59 to a shaft 60 carrying the sprockets 49 engaged in the perforations 48 in the tape 40. For details of the tape drive reference may be made to the copending application of Marcel Jules Helene Staar, Serial No. 181,544, filed March 22, 1962, entitled, Stepping Motor Device. The reciprocatory movement of the recording head 47 is synchronized with the intermittent advance of the tape 40, thereby producing a recording on the tape in the form of transverse arcuate traces longitudinally spaced by the distance of each step of advance of the tape, as explained more fully in said copending applications.

The power supply for operating the components of the machine may be provided by a plurality of flashlight batteries mounted within a removable casing 65 which may be snapped into position on the end of the housing. Alternatively, power may be supplied to the machine components from an outside current source as from the usual 110 volt office power supply and a converter within the removable power supply casing 65. The entire power supply assembly is supported on the dictating machine housing by a pair of projecting rails 88, 89 (FIG. 4) which are received within the casing 65. The rails are made of current conducting metal and serves as busses to energize the circuits of the machine.

A separate microphone may be provided connected by cable to the dictating machine for controlling the operation of the machine. The power supply for the machine is connected to the control circuit as by means of the switch 99 on the left-hand side of the housing as viewed in FIGURE 1. The microphone may provide means for controlling the operation of the dictating machine for recording and playback immediately of the recorded information for dictation.

In addition to the automatic electrically actuated drive for the tape, which will advance or back space the tape, means are also provided for manually moving the tape, herein shown as a manually operable hand wheel 102 associated with the stepping motor 56. This wheel 102 which is exposed in the right side of the housing as viewed in FIGURE 1, provides for manually turning the rotor of the stepping motor thereby advancing or backspacing the tape to any desired position. In this manner, the tape may be advanced to place a recording a substantial distance downstream of the recording and playback head, or the tape may be moved manually back to locate a previously recorded portion of dictation over the recording and playback head to enable the dictator to listen or to re-record, which is possible using magnetic tape, over the previous dictation.

Room is provided in the housing, however, for the various electrical components of the recording and playback head circuits, as well as for the components of the tape drive and recording head drive mechanisms and controls therefor. These various components are located around the movable and fixed mechanical elements of the apparatus. As herein shown, the entire apparatus is transistorized, drawing relatively low current such that a power supply comprising four flashlight batteries in the casing 65 is adequate to power the recording and playback head and the drive mechanisms for both the tape and the recording arm for extended periods without recharging or replacing the batteries, thereby providing a light, portable machine.

Referring now to FIG. 2, the machine is shown set up for transcribing a piece of dictation previously recorded on a length of magnetic tape 40-1. It will thus be seen that the record is in the form of a length of tape which is laid on the upper housing section 28 and extends therefrom under the pivotal bar 45 which extends transversely across the machine. One of the major features of the present invention is the provision of means including the knife 46 supported by the knife bar 45 for movement across the tape, for severing the tape after the dictation has been completed so as to separate the tape from the roll and to provide the record in the form of a short length of tape. In this way, the record may be easily handled either to be transcribed, filed, or mailed in the usual mailing envelope. To facilitate handling the relatively short piece of tape, the housing is provided with a removable cover insert 104 which may be positioned over the deep well or recess in which the roll 39 of magnetic tape is stored. This cover insert 104 as shown in FIG. 2 thus presents an inclined forward surface 104 and a flat top surface 106 concealing the recess and providing for support of the short length of recording tape. As shown in FIG. 2, the tape record 40-1 has progressed from an initial position in which the leading edge of the tape is positioned under the bar 45 and engaged in the sprockets much in the same manner that the end of the tape is positioned in FIGURE 1. During transcription as during recording, by means of the sprocket drive the tape is advanced intermittently past the reciprocating recording and playback head 47. For convenience and in keeping with the usual practice, the transcriber may use a headpiece, including an earphone, for listening to the dictation and may employ foot operated controls for advancing and backspacing the tape during the transcription process. It is contemplated that the same machine will be used for both dictation and transcription, separate means for connecting the transcription equipment and foot controls being provided as suitable.

The drive for the tape, as shown generally in FIGS. 4 and 5, comprises a pair of sprockets 49 on a sprocket shaft 60 operated by a stepping motor 56. This stepping motor device, which is described more fully in the copending application of Marcel Jules Helene Staar, Serial No. 181,544, filed March 22, 1962, comprises a rotor including the hand wheel member 102 which is supported on a horizontal shaft 204 carried on the frame of the machine and is connected through suitable gearing 59 to the sprocket shaft.

According to one of the features of the stepping motor arrangement, means are provided to mechanically produce a preference urging the rotor of the stepping motor in one direction or the other. Means are provided for urging the rotor in either the forward-advance direction or in the reverse-back space direction. For this purpose, referring to FIG. 4, mounted across this face of the stepping motor wheel 102 is an arm 222 carrying a ball 224 adjacent its outer end seating in wells or openings in the side of the stepping motor wheel. Means including the reverse solenoid RS shifts the position of the preference arm 222 to urge the rotor in the reverse direction. With the reverse solenoid RS deenergized and the arm active in the manner shown, upon reversal of polarity of the stator poles, the rotor will be given sufficient initial urging for it to move one step in the advance direction. With the reverse solenoid RS energized the stepping motor will be controlled to step in the reverse direction. Via the gear means to the sprocket shaft 60 of the tape drive mechanism, clockwise rotation of the stepping motor, as viewed in FIG. 5, produces advance motion of the tape and counterclockwise rotation of the stepping motor produces back spacing.

Having in mind that recording and playback head 47 and the stepping motor drive for the tape are synchronized, it will be noted that the distance from center line to center line of adjacent perforations in the tape is an even multiple of the longitudinal spacing between adjacent transverse traces. As therein shown, the tape is advanced one-half of the distance between the center lines of adjacent perforations each step of the intermittent drive and, hence, of the stepping motor. With this arrangement, each trace from left to right, as viewed in FIG. 4, begins substantially intermediate the perforations. With this arrangement the direction of motion of the head 47 is dependent upon the postition of the sprocket shaft 60 and the position of the sprockets. Thus, when a short length of tape is placed on the machine for transcribing, for example, as shown in FIG. 2, the length of tape is automatically positioned so that the recording head, when the drive is started, will be travelling in the same direction as the head travelled when the trace was originally recorded.

Further, by means described more fully in the above referred to copending applications, the stepping motor 56 may be operated to provide continuous stepping movement at a relatively rapid rate of the tape. Continuous stepping movement in the reverse or back spacing direction will permit automatic positioning of previously recorded sections of dictation over the recording and playback head 47. Of particular significance with respect to tape severing means constructed according to the present invention is the additional provision by which the stepping motor may be operated to advance the tape in rapid step-by-step movement. According to the present invention, the tape is automatically advanced a predetermined number of steps of the stepping motor responsive to cocking of the tape severing knife. How this is achieved will be set forth more fully below.

TAPE CUTTING

Figure 3:
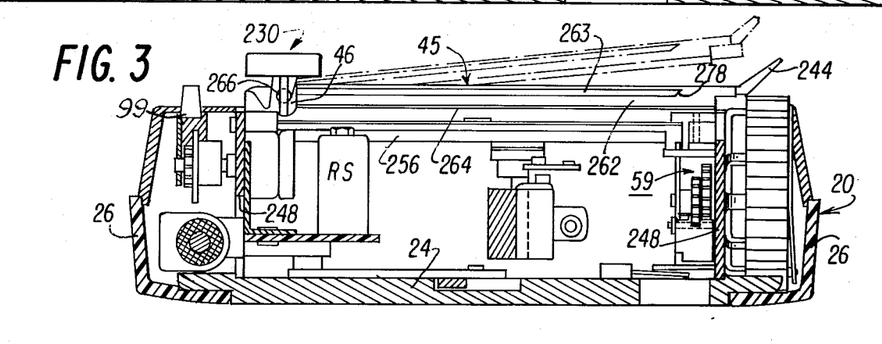
FIG. 3 is a transverse sectional view taken substantially in the plane of lines 3—3 of FIGURE 4.
Figures 9, 9A, 10:
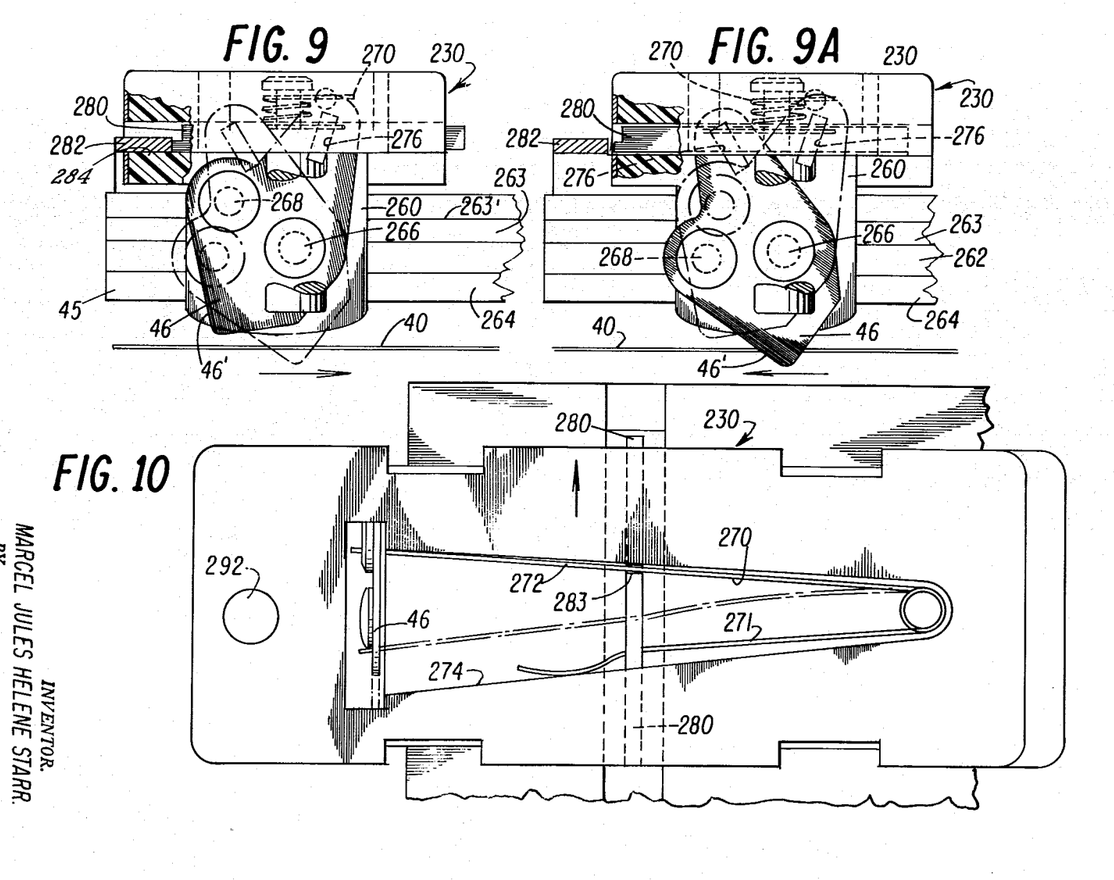
FIGS. 9 and 9A illustrate the tape knife in successive positions in the cocking and cutting strokes.
FIG. 10 is a plan view looking at the underside of the knife carriage.

Now turning to FIGS. 3–5, 9 and 9A, for a consideration of the structural aspects of the mechanism for cutting the tape, in keeping with the invention the knife 46 is normally carried above the tape as shown in FIGS. 3 and 9, and is supported in such elevated condition for movement from a rest non-interfering position (FIG. 3) adjacent one side of the tape by means including a carriage 230 which is slidable manually across the machine on the knife bar 45. For further carrying out the invention, in the course of such movement of the knife carriage across the machine, the knife 46 is lowered to cutting position. As a further incident to the movement of the knife carriage across the tape, resilient means are stressed, herein shown as an elongated helically wound spring 286 which is stretched as the carriage is moved, to provide means for returning the knife carriage automatically in a rapid cutting stroke, thereby producing a clean, neat cut across the tape.

As a further incident to the movement of the knife carriage 230 across the tape, latch means 233 is actuated to hold the carriage against immediate return in a cocked position at the far edge of the tape. The carriage 230 is released and automatically returned responsive to advance of the tape a predetermined distance so that the final recording trace will be downstream by a safe margin before the tape is cut. To make this operation consume as short a period as possible, the stepping motor 56 is caused to advance continuously and in rapid step-by-step manner responsive to latching the knife carriage in the cocked position and the knife carriage is released after a predetermined number of steps of the stepping motor according to the desired margin.

Referring now to FIGS. 3–5 and 11, the knife bar is pivotally mounted on a pair of pins 234, 236 which are rotatably supported by frame elements 238 fixed to the base plate 24 of the housing. The knife bar 45 is resiliently urged downward into bearing relation with the tape by a leaf spring 240 (FIG. 4) which is wiped by the bottom corner of the end 242 of the bar 45 as the bar is pivotally raised. The free end of bar 45 has an upwardly inclined projecting piece 244 under which the operator may insert his finger to facilitate raising the knife bar.

Extending transversely of the machine under the bar is a transverse support 246 forming a bridge between side frame members 248 fixed to the base plate 24 of the machine housing. The tape 40 is unwound from the roll 39 as an incident to the recording and playback process, and moved over the upper flat surface 250 of this transverse support 246 and is guided thereover by lateral fixed abutments 251 which are also carried by the transverse support 246. The lower housing section, as previously mentioned, also is shaped to define lateral guides 43, 44 for the tape which form a continuation of the above-mentioned abutments 251 to provide means for continuously guiding the tape past the sprockets 49 of the tape drive and to hold the tape in alignment therewith, and past the cutting mechanism including the knife 45 which is carried on the forward downstream transverse edge of the knife bar 45. Further to guide the tape, the under side of the knife bar 45 carries a pressure plate 252 which presents a soft fabric surface to the tape and is resiliently urged by lightsprings 254 downward into tape engagement. It will be noted particularly from FIG. 11, a view looking at the under side of the knife bar 45, that the knife 46 is spaced laterally only a short distance from the edge of the pressure plate 252, so that the plate is positioned to hold the tape against movement due to the action of the knife during the cutting stroke.

Further, in carrying out the invention, the transverse support 246 for the tape 40 terminates in a transverse edge or shoulder 256 (FIGS. 4 and 5) extending entirely across the support under the tape and cooperates with the knife so that the knife severs by a shearing action. In lowered position, as shown in FIG. 5, the knife extends below the surface of the support adjacent the shoulder 256 to cooperate therewith in cutting the tape.

The knife carriage 230 slidably rests on the upper transverse surface of the knife bar 45, and, as shown in FIG. 5, includes a body portion 258 of plastic or the like which is directly supported by the knife bar. The body member has a downwardly extending section 260 which hugs the downstream side of the knife bar. This side of the knife bar has a horizontal slot 262 which is formed between projecting lands 263, 264, the upper one (263) of which, as shown in FIG. 3, extends only part way the length of the side of the bar for cooperation with means on the knife support to cam the knife between elevated and lowered positions. For this purpose, the knife is pivotally supported on a pin 266 which, as shown in FIG. 9, is carried by the downwardly extending section 260 of the carriage member body 258 and extends horizontally parallel to the path of the tape so that the knife is pivotable about the axis. The knife 46 presents a sharp cutting edge 46' lowered into position facing the edge of the tape when the carriage is in the cocked, far position (shown in phantom in FIG. 8). The knife is pivotable on the pivotal support afforded by the pin 266 to raise and lower the cutting edge 46'. The motion of the knife 46 is produced by a camming pin 268 (appearing in FIG. 5) which is carried by the knife itself, and rides above the upper projecting land 263 on the cocking stroke of the carriage 230 which is from left to right in FIG. 3. How this camming pin 268 is effective to cam the knife 46 will be understood by referring to FIGS. 9 and 9A. Referring first to FIG. 9 which depicts the knife 46 in solid lines in the raised position pivoted clockwise while the carriage 230 moves in the cocking stroke under manual operation, the camming pin 268 rides along the upper edge 263' of the camming land 263, thereby holding the knife in the elevated position. Resilient means are provided tending to rotate the knife counterclockwise as viewed in FIG. 9 about its pivotal support 266, herein shown as a hairpin type spring 270 having, as shown in FIG. 10, a pair of extending arms 271, 272 trapped in a cavity 274 within the body 258 of the carriage with one of the spring arms (272) being received in a slot 276 in the upper end of the knife 46 and urging the knife in the requisite direction. The other spring arm 271 bears against a wall of the body cavity 274. At the completion of the cocking stroke of the carriage 230, the camming pin 268 is brought beyond the end 278 (FIG. 3) of the camming land 263 whereupon it drops into the slot 262 between the spaced lands 263, 264 due to the spring 270 acting on the knife. The knife 46 is thereby lowered into cutting position, in which it is shown in FIG. 9A, and is locked against upward pressure caused during the cutting stroke by the same camming pin 268 bearing against the underside of the land 263. At the completion of the cutting stroke, the knife is pivotally raised by means of a sliding member 280 which acts on the spring in the direction opposing its normal resilient action thereby to pivot the knife. For this purpose, the sliding member 280, which extends transversely of the carriage as viewed in FIGS. 9 and 10, is movable into contact with a fixed stop 282 on the bar, as an incident to movement of the carriage 230 in the cutting stroke to its rest position. The sliding member 280 is slotted as at 283 to receive the arm 272 of the spring 270 engaging and actuating the knife 46 and, in the course of the return movement of the knife carriage to its rest position engages the stop 282 thereby collapsing the spring 270 to pivot the knife. The sliding member 280 in the course of the return stroke of the carriage 230 is depicted in FIG. 9A at the instant prior to engagement of the sliding member against the vertical face of the stop 282. Upon further return movement of the carriage 230, the sliding member 280 is moved to the position shown in FIG. 9 with the stop 282 reaching into a recess 284 in the body 258 and forcing the sliding member 280 to the right in this figure, thereby moving the spring arm 272 and pivoting the knife via the spring arm which extends to and engages the knife 46.

A feature which contributes to obtaining a neat, clean cut in the tape is the provision to shoot the knife carriage 230 across the tape at a rapid rate of speed during the cutting stroke and to achieve this fully automatically once the carriage 230 is moved manually across the tape from its rest position. For this purpose, referring now to FIGS. 5, 8 and 11, the carriage 230 is connected to one end of a helically wound tension spring 286 which is received in a U-shaped slot 288 (FIG. 11) in the knife bar 45 and is fixed at its opposite end 290 to the bar. As the carriage 230 is moved from its rest position as viewed in FIG. 11, to the left as viewed in this figure looking at the under side of the bar 45, the spring 286 is stretched and elongated so that it exerts a spring force tending to return the carriage. The carriage 230 at the end of the cocking stroke across the tape engages a latching means 233, which latches and prevents the carriage 230 from returning to rest position immediately. It is mechanically held in the latched position after the operator removes his hand. In keeping with an important aspect of the invention, after a predetermined period, herein shown as providing for advance of the tape to produce a margin adjacent the final recording trace, the carriage 230 is automatically released and with the knife 46 now lowered into cutting position, is shot across the machine to cut the tape.

Figure 8:
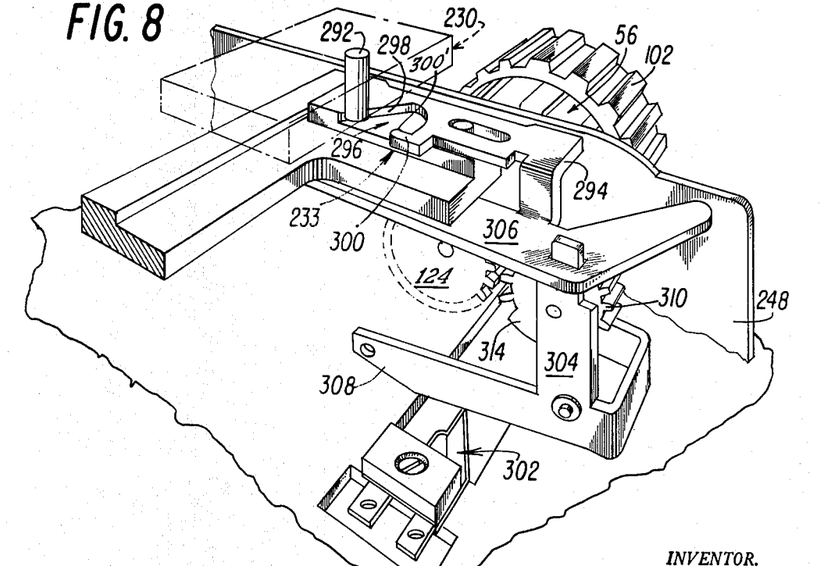
FIG. 8 is an enlarged perspective view of the knife switch actuating means.

The latch means 233 is shown particularly well in FIG. 8. A rod 292 projecting down from the under side of the carriage 230 is movable into engagement with a horizontally slidable plate latch 294 having a slot 296 presenting a camming edge 298 inclined to the axis of movement of the pin 292 under the carriage. The pin 292, in the course of movement of the carriage away from the rest position, engages the camming edge 298, thereby forcing the latch plate 294 forward from the initial engagement position shown in FIG. 8, whereupon a lug 300 on the side of the slot opposite the camming side 298 is moved into the return path of the pin 292, such that when the carriage 230 is released the rod returns and hits the lug which catches the rod and latches the carriage against further return movement. A lateral projection 300' on the lug 300 tends to restrain the latch patch 294 against return movement. To release the carriage 230 the latch plate 294 is returned horizontally rearwardly from the latching position by means described just below.

In the present case, the carriage 230 is released automatically after a predetermined number of steps of the tape in the advance direction by the stepping motor 56 following carriage latching. It is contemplated that the stepping motor will be operated in continuous step-by-step manner to rapidly move the tape, by control means including the knife switch 302 shown in FIG. 8, which is closed responsive to carriage latching. Reference may be made to the copending applications hereinbefore referred to for details of such control means. For present purposes, the stepping motor is operated continuously responsive to closing the knife switch 302. The knife switch 302, furthermore, is opened after a predetermined number of steps of the stepping motor 56. For this purpose, the knife switch 302 is operated by an actuator 304 pivotally mounted on the frame connected at its upper end to a depending section 306 of the latch plate 294 such that horaizontal movement of the plate 294 in the forward direction pivots the actuator 304 producing downward movement of the lower side 308 of the actuator into engagement with a flexible element 302' of the knife switch 302 to close the switch contacts, and horizontal movement of the latch plate 294 rearwardly pivots the actuator 304 in the opposite direction to raise the side 308 and open the knife switch contacts.

Figure 6:
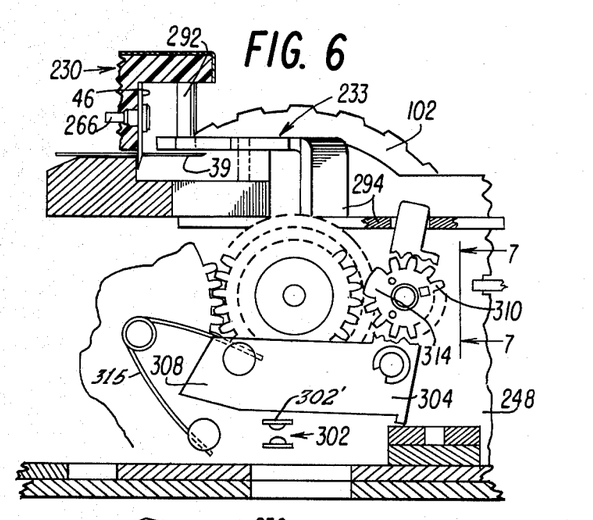
FIG. 6 is an enlarged elevational view with parts in section illustrating the knife switch actuating means.
Figure 7:
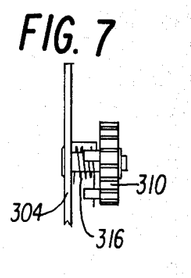
FIG. 7 is a detail view of the release gear.

To release the carriage 230 and as an incident thereto, to open the knife switch 302, means are provided including a release gear 310 which is effective to move the latch plate 294 rearward from its position latching the carriage against movement, thereby shifting the lug 300 of the latch from engagement with the rod 292 on the carriage and releasing the latter. The release gear 310 for this purpose, is carried by the knife switch actuator 304 and upon switch closing movement of the actuator, responsive to forward latching movement of the latch plate 294, is brought from the position of FIG. 8 into mesh with the drive gear 124 on the shaft of the stepping motor 56. The release gear is then rotated by the drive gear (FIG. 5) as the stepping motor operates in rapid step-by-step manner to advance the tape before the cutting operation. The release gear 310 includes a continuous, non-toothed section 314 which in the course of such rotation of the release gear by the drive gear is brought into engagement with the teeth of the drive gear after a number of steps of advance of the drive gear upon continuous step-by-step motion of the stepping motor. The position of the gears 310, 124 just prior to engagement is shown in FIG. 5A. Responsive to such engagement by the non-toothed section 314 of the release gear, as shown in FIG. 6, the knife switch actuator 304 is forced away from the drive gear, carrying the release gear 310 out of engagement, and moving the spring 315 over center, the said spring 315 completing the pivotal motion of the knife switch actuator 304 to its "off" postion, as shown in phantom in FIG. 5. A torsion spring 316, shown in detail in FIG. 7 fixed at one end and connected at the other end to the release gear 310 to be wound up upon counterclockwise rotation of the latter by the drive gear 124, serves as means to return the release gear 310 clockwise from the position in FIG. 6 to the start positions as shown in FIG. 8. It will be noted that the release gear 310 is rotated counterclockwise by the drive gear 124 while in engagement therewith to count out the desired number of advance steps of the stepping motor 56 before release after knife actuation. By having a different size release gear or one with a different number of teeth, means are provided for readily preselecting the number of steps of the stepping motor which will be taken.

Embodiment of FIGS. 12–23

Figures 12, 13, 19:
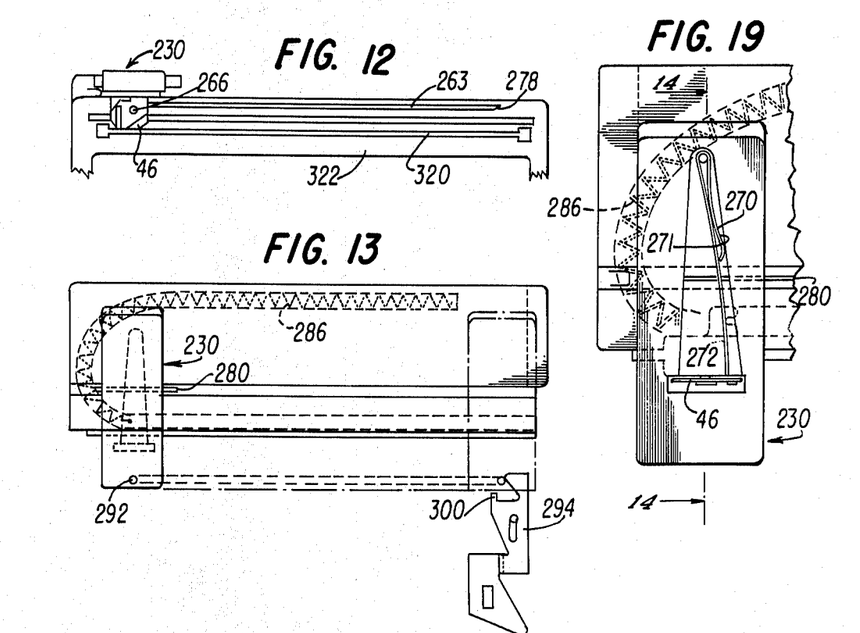
FIG. 12 is a fragmentary elevational view illustrating an alternative form of knife support means with the knife carriage in the rest position.
FIG. 13 is a plan view of the knife support means of FIG. 12.
FIG. 19 is a fragmentary plan view illustrating the knife carriage in rest position.
Figure 14:
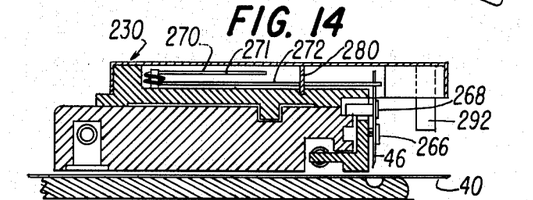
FIG. 14 is a sectional view taken in the plane of lines 14—14 of FIG. 19.

Now turning to FIGS. 12–23, an alternative means of support for the knife carriage 230 is shown, which support means is fixed rather than pivotally mounted on the machine frame. The tape 39 is shown in FIG. 12 threaded through a horizontal slot 320 in a transverse bridge 322 supporting the tape cutting mechanism. It is preferred to use the same means for feed of the tape as herein shown, for example, in FIG. 4. Where the same parts are found as in the previously described embodiment, the same reference numerals are used.

Figure 16:
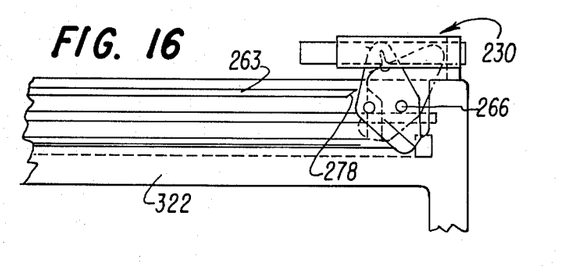
FIG. 16 is a fragmentary elevational view illustrating the knife carriage beyond the cocked position.
Figure 17:
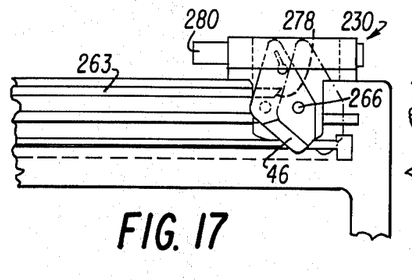
FIG. 17 is a fragmentary elevational view illustrating the knife carriage cocked.
Figure 21:
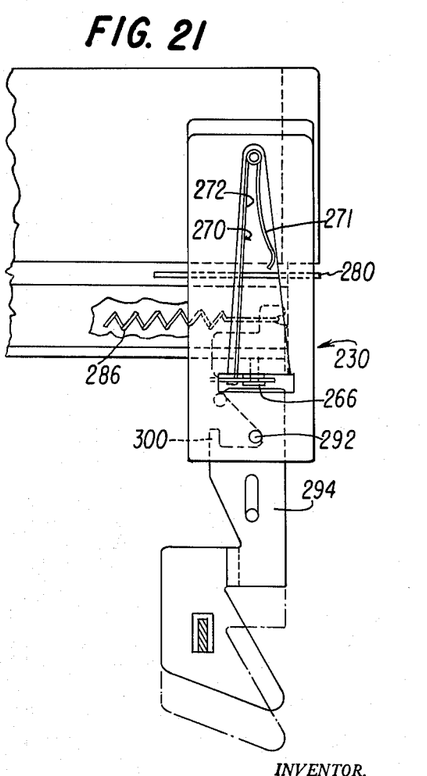
FIG. 21 is a fragmentary plan view illustrating the knife carriage beyond the cocked position.
Figure 22:
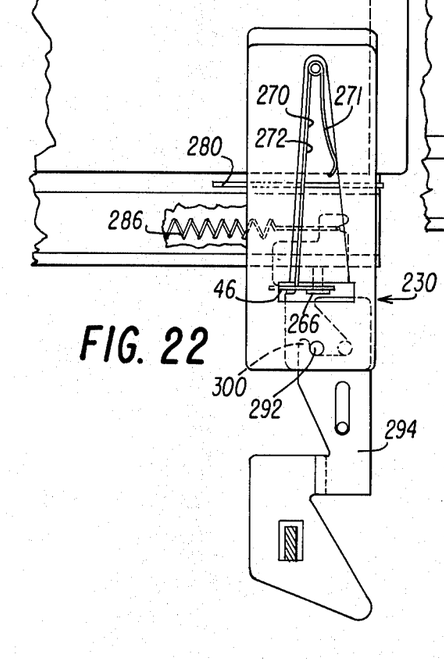
FIG. 22 is a fragmentary plan view illustrating the knife carriage cocked.

Thus, as shown in FIGS. 12 and 13, a slidable carriage 230 supports the tape cutting knife 46 adjacent the forward or downstream edge of the member 322 bridging the tape. The carriage 230 is movable from a rest position, as shown in FIGS. 12, 13 and 19, in a cocking stroke to a fully latched or cocked position, as shown in FIGS. 17 and 22, and therefrom in a cutting stroke, to the original rest position. The carriage 230 before being latched passes through an intermediate position beyond the latched position, as shown in FIGS. 16 and 21.

Figure 15:
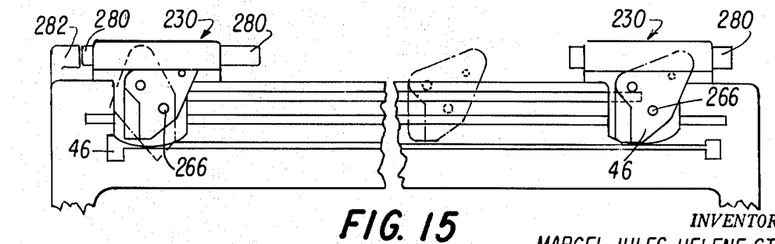
FIG. 15 is an enlarged fragmentary elevational view of the knife support means of FIG. 12 with the knife carriage shown in rest and partially cocked positions.
Figure 18:
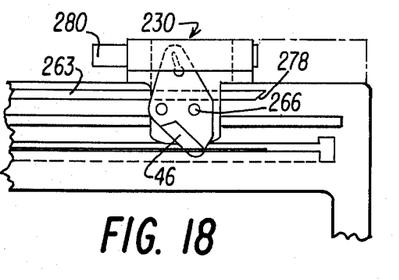
FIG. 18 is a fragmentary elevational view illustrating the knife carriage after release during the cutting stroke.
Figure 20:
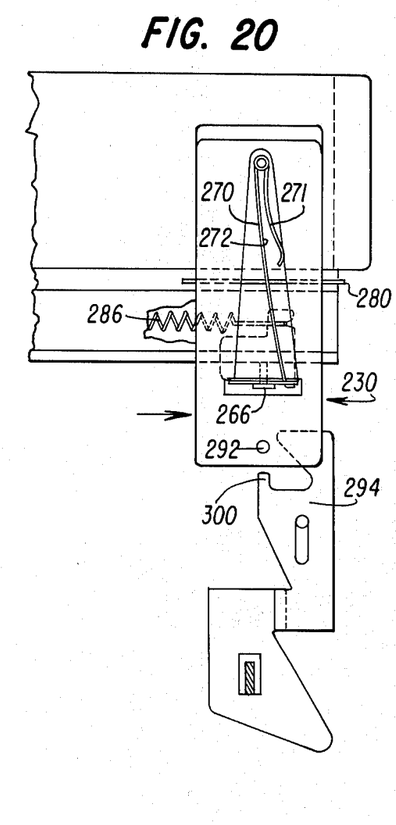
FIG. 20 is a fragmentary plan view illustrating the knife carriage partially cocked.
Figure 23:
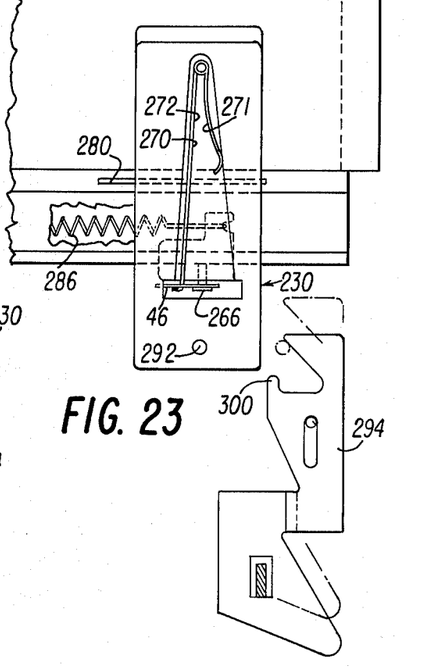
FIG. 23 is a fragmentary plan view illustrating the knife carriage after release during the return stroke.

The knife 46 is movable between an elevated and a lowered position, and to this end, is carried on a horizontal pin 266 for pivotal movement. The elevated position of the knife 46 is shown in FIGS. 12 and 15, while the cutting position of the knife is shown in FIGS. 16–18. The knife 46 is pivoted downward by means herein shown as a hairpin type spring 270 having a pair of arms 271, 272 resiliently tending to spread from the collapsed position of FIG. 19 to which they have been forced by a member 280 slidably received by the carriage 230. One arm 272 of the spring 270 engages the knife 46 through an opening in the latter, tending to pivot the knife counterclockwise about its pivotal support. A camming pin 268 carried by the knife 46, is positioned during the cocking stroke of the carriage 230 above a camming land 263 on the forward side of the knife bridge 322 to hold the knife in elevated position. At the end of the cocking stroke, the camming pin is brought beyond the end 278 of the camming land 263, thereby allowing the knife to drop to its cutting position (FIG. 16). The knife is raised to the elevated position at the end of the return stroke. For this purpose, a fixed stop 282 on the knife bridge 322 is engaged by a sliding return actuator 280 carried by the carriage 230, in the course of the terminal portion of the return stroke of the carriage, whereby the actuator 280 is forced from a position in which it projects from the left side of the carriage, as shown in FIG. 23, to a position projecting from the opposite side of the carriage, as shown in FIG. 19. The actuator 280 is connected to the arm 272 of the spring 270 such that in the course of such sliding movement, caused by engagement with the stop, the spring 270 is collapsed, pivoting the knife clockwise and raising it to the elevated position due to the movement of the end of the spring arm 272 which is engaged in the knife.

The carriage 230 is latched in a position at the far side of the tape in a similar manner to that previously described in connection with the embodiment of FIGS. 3–11. Thus, referring to FIGS. 16 and 21 at the end of the cocking stroke a pin 292 depending from the carriage engages and cams the latch plate 294 forwardly from the position of FIG. 21 to the position of FIG. 22. Upon return movement of the carriage from the far position of FIG. 21, the pin 292 is engaged by a lug 300 in the latch plate and held against further movement to latch the carriage. Responsive to rearward movement of the latch plate 294, as for example, following advance of the tape for a predetermined distance, the carriage is released and, under the urging of an elongated tension spring 286, is rapidly shot through the cutting stroke to sever the tape.

I claim as my invention:

1. In web cutting apparatus, the combination comprising, means providing a web supporting surface over which a web is adapted to be led, said surface terminating in a sharp edge extending transversely of the web, a knife support carried over said surface parallel with said edge, a knife carried by said support for movement across the surface adjacent the edge in an advance cocking stroke and in a return cutting stroke, means pivotally carrying the knife for movement from an elevated position free from web contact during the cocking stroke to a lowered position in web shearing relation with said edge during the return cutting stroke to sever the web, a spring urging said knife toward the lowered position and means for positively maintaining said knife in said elevated position during said cocking stroke including an element connected to said knife cooperating with means on said support for pivoting said knife between said elevated and lowered positions under the urging of said spring as an incident to completion of the knife cocking stroke.

2. In web cutting apparatus, the combination comprising, means providing a web supporting surface over which a web is adapted to be led, a knife carried for movement transversely of the web, means including a bar over said surface and a carriage carrying said knife and movable along said bar for supporting the knife for movement across the web in an advance cocking stroke and in a return cutting stroke, means on said carriage carrying said knife for pivotal movement from an elevated position free from web contact during the cocking stroke to a lowered cutting position extending below said surface during the return cutting stroke to sever the web, and means for positively maintaining said knife in said positions during said strokes respectively, including an element connected to said knife and riding above a horizontal land on the bar during the advance stroke to raise said knife and below said land during the return stroke to hold said knife in the cutting position.

3. In web cutting apparatus, the combination comprising, means providing a surface over which a web is adapted to be led, a knife carried for movement transversely of the web, means for supporting the knife including a transverse bar over said surface and a carriage slidable across said bar in an advance cocking stroke and in a return cutting stroke, means on said carriage supporting the knife for movement from an elevated position during the cocking stroke to a lowered cutting position during the return cutting stroke, and means including a tension spring carried in a transverse slot on the underside of said bar and connected between a fixed point on the bar and the carriage so as to be stressed upon the cocking stroke of the carriage for moving said carriage through the cutting stroke to sever the web.

4. In apparatus for sound recording and playback wherein the recording is in the form of longitudinally spaced transverse traces across a relatively wide band of recording tape, the combination comprising, means providing a surface over which the tape is adapted to be led, a knife carried for movement transversely of the tape, means for supporting the knife including a carriage slidable across the tape in an advance cocking stroke and in a return cutting stroke, means on said carriage supporting the knife for movement from an elevated position free from tape contact during the cocking stroke to a lowered cutting position during the return cutting stroke, means for lowering the knife into cutting position as an incident to the cocking stroke while maintaining the knife in the elevated position until it has traversed the entire width of the tape, means for latching the carriage against immediate return movement with the knife in cutting position responsive to completing the cocking stroke, means actuated responsive to latching the carriage for moving a predetermined length of tape past the knife with the carriage in the latched position, and means for unlatching the carriage for the cutting stroke with the tape stopped.

5. In apparatus for sound recording and playback wherein the recording is in the form of longitudinally spaced transverse traces across a relatively wide band of recording tape, the combination comprising, means providing a surface over which the tape is adapted to be led, means for moving said tape, a knife carried for movement transversely of the tape, means for supporting the knife for movement across the tape in an advance cocking stroke and in a return cutting stroke, means for latching the knife against immediate return movement responsive to completing the cocking stroke, and means actuated responsive to cocking the knife for moving a predetermined length of tape past the knife while in the latched position and for unlatching the knife for the cutting stroke to sever the tape after said predetermined length of tape is moved past the knife.

6. In web cutting apparatus, the combination comprising, means providing a surface over which a web is adapted to be led, a knife carried for movement transversely of the web, means for supporting the knife including a carriage movable across the web in an advance cocking stroke and in a return cutting stroke, means for supporting the carriage including a bar pivotally mounted on the apparatus at one side of the web for movement from a horizontal web engaging position to a raised position above the web wherein one end of said bar is free from the apparatus, means on said carriage supporting the knife for movement from an elevated position during the cocking stroke to a lowered cutting position during the return cutting stroke, and means including a spring housed in said bar and connected between a point on said bar and said carriage so as to be stressed upon the cocking stroke of the carriage for moving said carriage through the cutting stroke to sever the web.

7. In web cutting apparatus, the combination comprising, means providing a surface over which a web is adapted to be led, a knife carried for movement transversely of the web, means for supporting the knife for movement across the web in an advance cocking stroke without contacting the web and in a return cutting stroke, means for latching the knife against immediate return cutting movement at the end of the cocking stroke, means including a stepping motor for moving the web, control means for said stepping motor including a switch, said stepping motor being operated continuously in response to actuation of said switch, and means for actuating said switch responsive to latching the knife for moving a predetermined length of web past the knife with the latter in the latched position.

References Cited by the Examiner
UNITED STATES PATENTS

| | | | |
|---|---|---|---|
| 630,019 | 8/1899 | Worthen | 83—455 |
| 866,277 | 9/1907 | Heinen et al | 83—614 |
| 942,164 | 12/1909 | Bolton | 83—614 |
| 1,384,984 | 7/1921 | Wegner | 83—455 |
| 1,447,091 | 2/1923 | Lansing | 83—614 |
| 1,947,205 | 2/1934 | Jaeger | 83—240 |
| 1,967,853 | 7/1934 | Abbott | 83—455 |
| 2,465,453 | 3/1949 | Holbrook | 83—240 |
| 2,604,943 | 7/1952 | Brown | 83—455 |
| 2,665,757 | 1/1954 | Stevens et al. | 83—455 |
| 2,696,867 | 12/1954 | Wensink | 83—455 |
| 2,732,899 | 1/1956 | Wales | 83—278 |
| 2,819,071 | 1/1958 | Dietz | 226—76 |
| 3,028,063 | 4/1962 | Busch | 226—76 |
| 3,050,105 | 8/1962 | Dolby | 179—100.2 |

ANDREW R. JUHASZ, *Primary Examiner.*

CARL W. TOMLIN, HUNTER C. BOURNE, *Examiners.*